US010466617B2

United States Patent
Tonges et al.

(10) Patent No.: US 10,466,617 B2
(45) Date of Patent: Nov. 5, 2019

(54) CAPACITIVE TONER LEVEL SENSOR

(71) Applicant: LEXMARK INTERNATIONAL, INC., Lexington, KY (US)

(72) Inventors: Jeffrey Lawrence Tonges, Versailles, KY (US); Brad Edward Mattingly, Lawrenceburg, KY (US); Jarrett Clark Gayne, Lexington, KY (US); Ann Marie Trebolo, Nicholasville, KY (US); Gregory Alan Cavill, Winchester, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 15/846,642

(22) Filed: Dec. 19, 2017

(65) Prior Publication Data
US 2019/0187585 A1  Jun. 20, 2019

(51) Int. Cl.
*G03G 21/12* (2006.01)
*G03G 15/08* (2006.01)
*G01F 23/26* (2006.01)

(52) U.S. Cl.
CPC ....... *G03G 15/0856* (2013.01); *G01F 23/263* (2013.01); *G03G 15/0865* (2013.01); *G03G 21/12* (2013.01)

(58) Field of Classification Search
CPC ........... G03G 15/0856; G03G 15/0865; G03G 21/12; G01F 23/263
See application file for complete search history.

(56) References Cited

U.S. PATENT DOCUMENTS

| | | | | |
|---|---|---|---|---|
| 3,520,445 A | * | 7/1970 | Hansen | G01F 23/263 222/198 |
| 4,133,453 A | * | 1/1979 | Ohbora | G01F 23/263 222/39 |
| 4,449,405 A | * | 5/1984 | Franz | G01F 23/263 324/690 |
| 5,465,619 A | * | 11/1995 | Sotack | G01F 23/265 118/694 |
| 5,500,714 A | * | 3/1996 | Yashiro | G03G 21/1832 399/111 |
| 5,878,309 A | * | 3/1999 | Nomura | G03G 21/181 399/111 |
| 5,987,269 A | | 11/1999 | Allen et al. | |
| 6,035,150 A | * | 3/2000 | Domon | G03G 15/0856 399/254 |
| 6,141,508 A | * | 10/2000 | Sasaki | G03G 21/1814 399/111 |
| 6,169,865 B1 | * | 1/2001 | Miyabe | G03G 15/0896 399/111 |

(Continued)

OTHER PUBLICATIONS

U.S. Appl. No. 15/259,522, filed Sep. 8, 2016 (Barry et al.).

*Primary Examiner* — David J Bolduc

(57) ABSTRACT

A toner container according to one example embodiment includes a housing having a reservoir for holding toner. A first electrode and a second electrode are positioned on the housing. The first electrode and the second electrode form a capacitor having a capacitance that changes in response to a change in an amount of toner in the reservoir between the first electrode and the second electrode. The first electrode includes a first rod and the second electrode includes a second rod spaced from the first rod.

16 Claims, 10 Drawing Sheets

(56) References Cited

U.S. PATENT DOCUMENTS

| | | | |
|---|---|---|---|
| 6,253,036 B1 * | 6/2001 | Karakama | G03G 21/1814 399/119 |
| 6,397,017 B1 * | 5/2002 | Sakai | G03G 21/1867 399/27 |
| 6,397,018 B1 * | 5/2002 | Matsumoto | G03G 21/1867 399/27 |
| 6,472,887 B1 * | 10/2002 | Tullis | G01F 23/263 324/662 |
| 6,775,487 B2 * | 8/2004 | Kakeshita | G03G 21/1889 399/27 |
| 7,555,231 B2 | 6/2009 | Etter et al. | |
| 8,036,544 B2 * | 10/2011 | Toda | G03G 15/086 399/27 |
| 8,116,641 B2 | 2/2012 | Soutome | |
| 8,718,496 B2 | 5/2014 | Barry et al. | |
| 9,109,939 B2 | 8/2015 | Barry et al. | |
| 9,317,005 B2 | 4/2016 | Monde et al. | |
| 9,395,645 B2 | 7/2016 | Barry et al. | |
| 2001/0021314 A1 * | 9/2001 | Hibi | G03G 15/0856 399/27 |
| 2001/0038758 A1 * | 11/2001 | Oguma | G03G 21/1814 399/27 |
| 2001/0043814 A1 * | 11/2001 | Abe | G03G 21/1814 399/27 |
| 2002/0009303 A1 * | 1/2002 | Matsumoto | G03G 15/0812 399/27 |
| 2002/0012542 A1 * | 1/2002 | Karakama | G03G 21/1867 399/27 |
| 2002/0021908 A1 * | 2/2002 | Matsumoto | G03G 21/1814 399/27 |
| 2002/0025174 A1 * | 2/2002 | Sakurai | G03G 21/1814 399/13 |
| 2002/0025177 A1 * | 2/2002 | Yokoi | G03G 15/0896 399/27 |
| 2002/0159780 A1 * | 10/2002 | Chadani | G03G 21/1814 399/27 |
| 2002/0172521 A1 * | 11/2002 | Oguma | G03G 21/1867 399/27 |
| 2003/0016955 A1 * | 1/2003 | Hiratsuka | G03G 15/0803 399/27 |
| 2003/0123888 A1 * | 7/2003 | Naito | G03G 15/0856 399/27 |
| 2003/0180061 A1 * | 9/2003 | Oguma | G03G 21/1867 399/27 |
| 2006/0008287 A1 * | 1/2006 | Noda | F16D 1/101 399/90 |
| 2007/0003305 A1 * | 1/2007 | Verheijen | G03G 15/0907 399/55 |
| 2007/0065166 A1 * | 3/2007 | Takiguchi | G03G 21/12 399/35 |
| 2008/0069576 A1 * | 3/2008 | Etter | G03G 21/12 399/35 |
| 2010/0028025 A1 * | 2/2010 | Yoshida | G03G 15/081 399/12 |
| 2011/0069978 A1 * | 3/2011 | Yamamoto | G03G 15/0856 399/27 |
| 2012/0121275 A1 * | 5/2012 | Kanai | G03G 15/0856 399/27 |
| 2013/0266329 A1 * | 10/2013 | Otani | G03G 15/0849 399/27 |
| 2013/0308965 A1 * | 11/2013 | Tsuchiya | G03G 15/086 399/27 |
| 2014/0023385 A1 * | 1/2014 | Hosoya | G03G 15/086 399/27 |
| 2014/0037305 A1 * | 2/2014 | Monde | G03G 15/086 399/27 |

* cited by examiner

CAPACITIVE TONER LEVEL SENSOR

CROSS REFERENCES TO RELATED APPLICATIONS

None.

BACKGROUND

1. Field of the Disclosure

The present disclosure relates generally to image forming devices and more particularly to a capacitive toner level sensor.

2. Description of the Related Art

During the electrophotographic printing process, an electrically charged rotating photoconductive drum is selectively exposed to a laser beam. The areas of the photoconductive drum exposed to the laser beam are discharged creating an electrostatic latent image of a page to be printed on the photoconductive drum. Toner particles are then electrostatically picked up by the latent image on the photoconductive drum creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units installed in the image forming device. As these replaceable units run out of toner, the units must be replaced or refilled in order to continue printing. Further, residual or waste toner generated during the printing process is also typically stored in a replaceable unit installed in the image forming device. When the replaceable unit holding waste toner fills, it must be emptied or replaced in order to accommodate additional waste toner. As a result, it is desired to measure the amount of toner residing in these units in order to warn the user that a replaceable unit storing the toner supply is near an empty state or that a replaceable unit storing waste toner is near a full state. Accordingly, a system for measuring the amount of toner residing in a replaceable unit of an image forming device is desired.

SUMMARY

A toner container according to one example embodiment includes a housing having a reservoir for holding toner. A first electrode and a second electrode are positioned on the housing. The first electrode and the second electrode form a capacitor having a capacitance that changes in response to a change in an amount of toner in the reservoir between the first electrode and the second electrode. The first electrode includes a first rod and the second electrode includes a second rod spaced from the first rod. The first rod and the second rod are each positioned within the reservoir. In some embodiments, the second rod is substantially parallel to the first rod.

A toner container according to another example embodiment includes a housing having a reservoir for holding toner. A first electrode and a second electrode are positioned on the housing. The first electrode and the second electrode form a capacitor having a capacitance that changes in response to a change in an amount of toner in the reservoir between the first electrode and the second electrode. The first electrode includes a first rod and the second electrode includes a second rod. The second rod is parallel to the first rod and is spaced radially from the first rod relative to a longitudinal axis of the first rod.

A toner container according to another example embodiment includes a housing having a reservoir for holding toner. A first electrode and a second electrode are positioned on the housing. The first electrode and the second electrode form a capacitor having a capacitance that changes in response to a change in an amount of toner in the reservoir between the first electrode and the second electrode. The first electrode includes a first rod and a second rod electrically connected to the first rod. The second electrode includes a third rod and a fourth rod electrically connected to the third rod. The third rod is parallel to the first rod and is spaced radially from the first rod relative to a longitudinal axis of the first rod. The fourth rod is parallel to the second rod and is spaced radially from the second rod relative to a longitudinal axis of the second rod.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
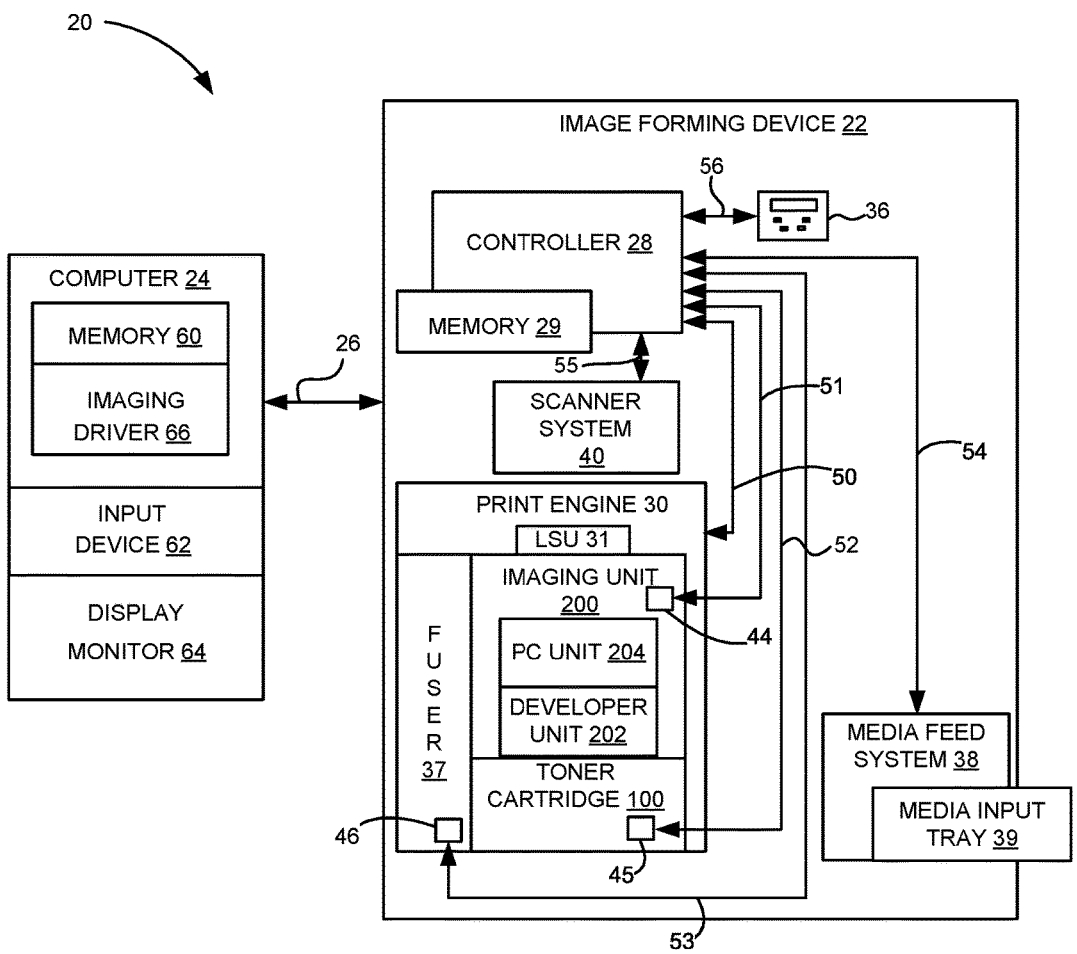
FIG. 1 is a block diagram of an imaging system according to one example embodiment.

Referring now to the drawings and particularly to FIG. 1, there is shown a block diagram depiction of an imaging system 20 according to one example embodiment. Imaging system 20 includes an image forming device 22 and a computer 24. Image forming device 22 communicates with computer 24 via a communications link 26. As used herein, the term "communications link" generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (AIO) device) that includes a controller 28, a print engine 30, a laser scan unit (LSU) 31, an imaging unit 200, a toner cartridge 100, a user interface 36, a media feed system 38, a media input tray 39 and a scanner system 40. Image forming device 22 may communicate with computer 24 via a standard communication protocol, such as, for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated electronic memory 29. The processor may include one or more integrated circuits in the form of a microprocessor or central processing unit and may be formed as one or more Application-specific integrated circuits (ASICs). Memory 29 may be any volatile or non-volatile memory or combination thereof, such as, for example, random access memory (RAM), read only memory (ROM), flash memory and/or non-volatile RAM (NVRAM). Memory 29 may be in the form of a separate memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with imaging unit 200 and processing circuitry 44 thereon via a communications link 51. Controller 28 communicates with toner cartridge 100 and processing circuitry 45 thereon via a communications link 52. Controller 28 communicates with a fuser 37 and processing circuitry 46 thereon via a communications link 53. Controller 28 communicates with media feed system 38 via a communications link 54. Controller 28 communicates with scanner system 40 via a communications link 55. User interface 36 is communicatively coupled to controller 28 via a communications link 56. Controller 28 processes print and scan data and operates print engine 30 during printing and scanner system 40 during scanning. Processing circuitry 44, 45, 46 may provide authentication functions, safety and operational interlocks, operating parameters and usage information related to imaging unit 200, toner cartridge 100 and fuser 37, respectively. Each of processing circuitry 44, 45, 46 includes a processor unit and associated electronic memory. As discussed above, the processor may include one or more integrated circuits in the form of a microprocessor or central processing unit and may be formed as one or more Application-specific integrated circuits (ASICs). The memory may be any volatile or non-volatile memory or combination thereof or any memory device convenient for use with processing circuitry 44, 45, 46.

Computer 24, which is optional, may be, for example, a personal computer, including electronic memory 60, such as RAM, ROM, and/or NVRAM, an input device 62, such as a keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes a laser scan unit (LSU) 31, toner cartridge 100, imaging unit 200 and fuser 37, all mounted within image forming device 22. Imaging unit 200 is removably mounted in image forming device 22 and includes a developer unit 202 that houses a toner reservoir and a toner development system. In one embodiment, the toner development system utilizes what is commonly referred to as a single component development system. In this embodiment, the toner development system includes a toner adder roll that provides toner from the toner reservoir to a developer roll. A doctor blade provides a metered uniform layer of toner on the surface of the developer roll. In another embodiment, the toner development system utilizes what is commonly referred to as a dual component development system. In this embodiment, toner in the toner reservoir of developer unit 202 is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, developer unit 202 includes a developer roll that attracts the magnetic carrier beads having toner thereon to the developer roll through the use of magnetic fields. Imaging unit 200 also includes a photoconductor unit ("PC unit") 204 that houses a photoconductive drum and a waste toner removal system.

Toner cartridge 100 is removably mounted in imaging forming device 22 in a mating relationship with developer unit 202 of imaging unit 200. An outlet port on toner cartridge 100 communicates with an inlet port on developer unit 202 allowing toner to be periodically transferred from toner cartridge 100 to resupply the toner reservoir in developer unit 202.

The electrophotographic printing process is well known in the art and, therefore, is described briefly herein. During a printing operation, a charge roll in PC unit 204 electrically charges the outer surface of the photoconductive drum in PC unit 204 to a predetermined voltage. Laser scan unit 31 then discharges a selected portion of the outer surface of the photoconductive drum to create a latent image on the outer surface of the photoconductive drum. Toner is transferred from the toner reservoir in developer unit 202 to the latent image on the photoconductive drum by the developer roll to create a toned image on the outer surface of the photoconductive drum. The toned image is then transferred to a media sheet received by imaging unit 200 from media input tray 39 for printing. Toner may be transferred directly to the media sheet by the photoconductive drum or by an intermediate transfer member that receives the toner from the photoconductive drum. Toner remnants are removed from the photoconductive drum by the waste toner removal system. The toner image is bonded to the media sheet in fuser 37 and then sent to an output location or to one or more finishing options such as a duplexer, a stapler or a hole-punch.

Figure 2:
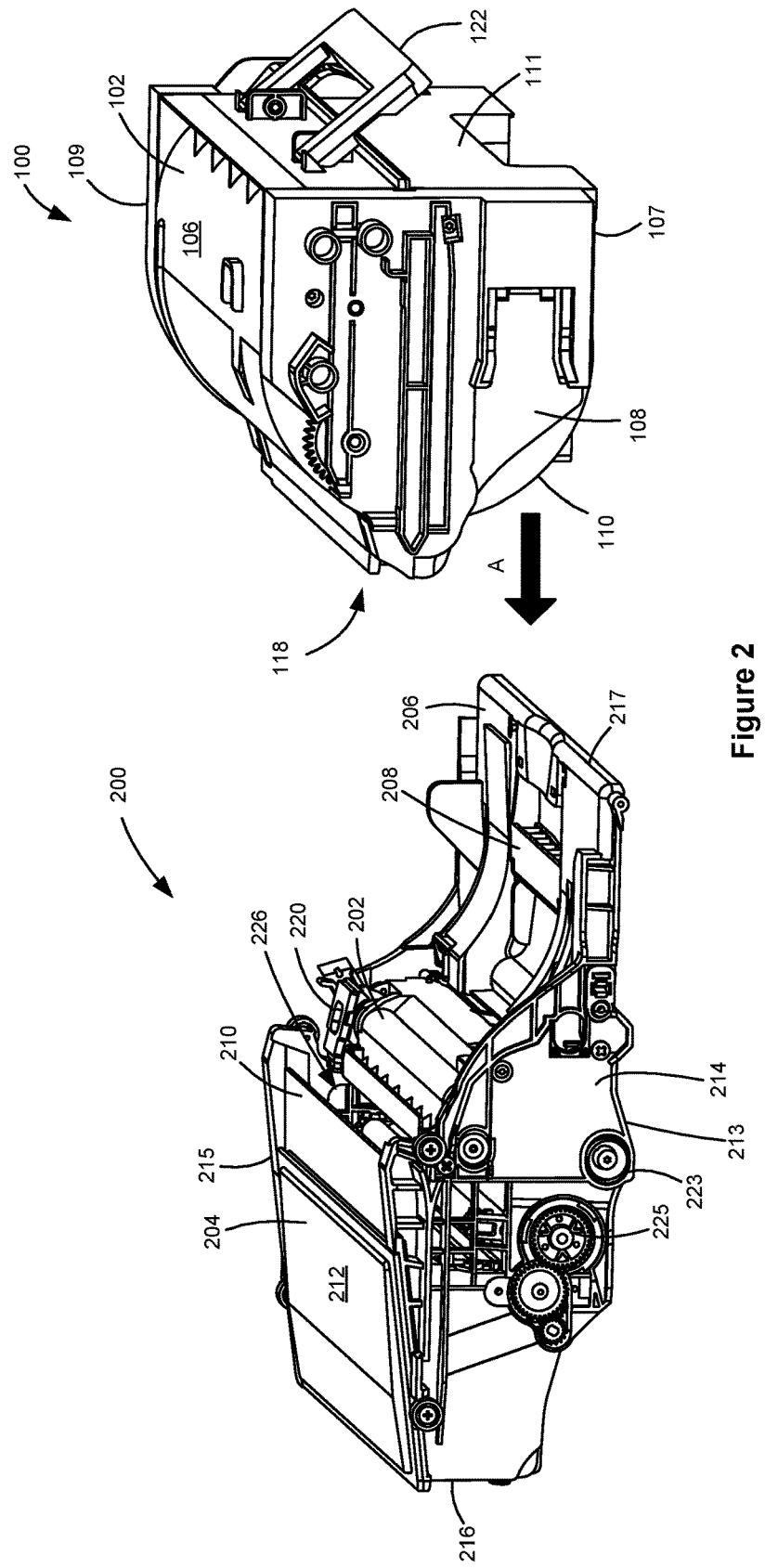
FIG. 2 is a perspective view of a toner cartridge and an imaging unit according to one example embodiment.

Referring now to FIG. 2, toner cartridge 100 and imaging unit 200 are shown according to one example embodiment. Toner cartridge 100 and imaging unit 200 are each removably installable in image forming device 22. Imaging unit 200 is first slidably inserted into image forming device 22. Toner cartridge 100 is then inserted into image forming device 22 in a mating relationship with imaging unit 200 as indicated by the arrow A shown in FIG. 2, which also indicates the direction of insertion of toner cartridge 100 and imaging unit 200 into image forming device 22. This arrangement allows toner cartridge 100 to be removed and reinserted easily when replacing an empty toner cartridge 100 without having to remove imaging unit 200. Imaging unit 200 may also be readily removed as desired in order to maintain, repair or replace the components associated with imaging unit 200 or to clear a media jam.

Toner cartridge 100 includes an enclosed reservoir for storing the main toner supply for image forming device 22. Toner cartridge 100 includes a top 106, a bottom 107, first and second sides 108, 109, a front 110 and a rear 111. Front 110 of toner cartridge 100 leads during insertion of toner cartridge 100 into image forming device 22 and rear 111 trails. An outlet port 118 in fluid communication with the toner reservoir of toner cartridge 100 is positioned facing downward on front 110 of toner cartridge 100 near side 109 for exiting toner from toner cartridge 100. A handle 122 may be provided on top 106 or rear 111 of toner cartridge 100 to assist with insertion and removal of toner cartridge 100 into and out of image forming device 22.

Figure 3:
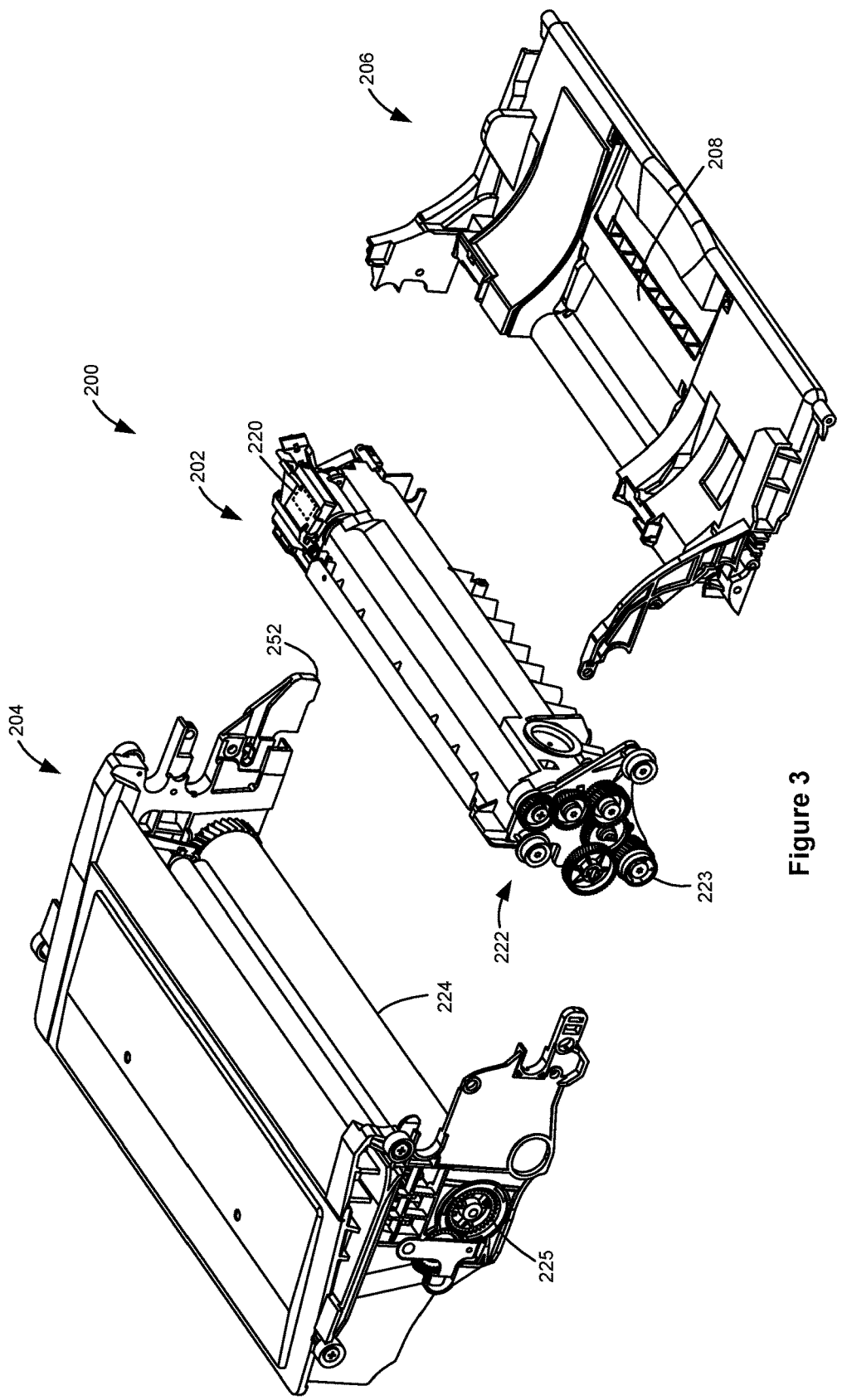
FIG. 3 is an exploded perspective view of the imaging unit shown in FIG. 2.

Imaging unit 200 is shown according to one example embodiment in FIGS. 2 and 3. In the example embodiment illustrated, imaging unit 200 includes a developer unit 202 mounted against a PC unit 204. A handle frame 206 is attached to PC unit 204. Imaging unit 200 includes a top 212, a bottom 213, first and second sides 214, 215, a front 216 and a rear 217. Front 216 of imaging unit 200 leads during insertion of imaging unit 200 into image forming device 22 and rear 217 trails. PC unit 204 is positioned at front 216 of imaging unit 200 and handle frame 206 is positioned at rear 217 of imaging unit 200. Handle frame 206 includes a handle 208 exposed on imaging unit 200 for user engagement to assist with insertion and removal of imaging unit 200 into and out of image forming device 22. Handle frame 206 may also include alignment features that aid in aligning toner cartridge 100 with imaging unit 200 during insertion of toner cartridge 100 into image forming device 22.

Developer unit 202 includes a toner inlet port 220 on top 212 of imaging unit 200 near side 215 that is positioned to receive toner from toner cartridge 100. Toner received by inlet port 220 is stored in the toner reservoir of developer unit 202. Developer unit 202 includes a rotatable developer roll 222 that is mated with a rotatable photoconductive drum ("PC drum") 224 of PC unit 204. As discussed above, developer roll 222 transfers toner from the toner reservoir in developer unit 202 to the latent image on PC drum 224 to create a toned image on the surface of PC drum 224. Developer unit 202 may also include one or more toner agitators for mixing toner stored in the toner reservoir of developer unit 202 and may further include a toner adder roll for moving toner in the toner reservoir to the outer surface of developer roll 222. In the example embodiment illustrated, developer unit 202 includes a drive coupler 223 exposed on side 214 of imaging unit 200. Drive coupler 223 mates with a corresponding drive coupler in image forming device 22 when imaging unit 200 is installed in image forming device 22 in order to receive rotational motion from an electric motor in image forming device 22. Drive coupler 223 is rotatably coupled to developer roll 222 via a drive train on developer unit 202 such that rotation of drive coupler 223 provides rotational motion to developer roll 222. Drive coupler 223 may also be rotatably coupled to other components of developer unit 202, such as a toner adder roll and/or various toner agitators of developer unit 202.

PC unit 204 includes a rotatable PC drum 224 as discussed above. A portion of the outer surface of PC drum 224 is exposed on bottom 213 of imaging unit 200. Toner on the outer surface of PC drum 224 is transferred from the portion of the outer surface of PC drum 224 that is exposed on bottom 213 of imaging unit 200 to a media sheet or intermediate transfer member during a print operation. PC unit 204 also includes a drive coupler 225 exposed on side 214 of imaging unit 200. Drive coupler 225 mates with a corresponding drive coupler in image forming device 22 when imaging unit 200 is installed in image forming device 22 in order to receive rotational motion from an electric motor in image forming device 22. Drive coupler 225 is rotatably coupled to PC drum 224 such that rotation of drive coupler 225 provides rotational motion to PC drum 224. For example, in the embodiment illustrated, drive coupler 225 is positioned on an axial end of PC drum 224. A narrow slit 226 is formed between PC unit 204 and developer unit 202 at the top 212 of imaging unit 200. Slit 226 permits a laser of laser scan unit 31 to discharge selected portions of the outer surface of PC drum 224 in order to create the latent image on the outer surface of PC drum 224. PC unit 204 also includes a waste toner removal system (not shown) that removes toner remnants from the outer surface of PC drum 224 after toner is transferred from the outer surface of PC drum 224 to the media sheet or intermediate transfer member. The waste toner removal system may include a cleaner blade (or roll) in contact with the outer surface of PC drum 224 for removing waste toner from the outer surface of PC drum 224 and may further include one or more toner conveyance mechanisms, e.g., an auger, paddle, etc., that moves toner removed from the outer surface of PC drum 224 to a waste toner storage reservoir.

Figure 4:
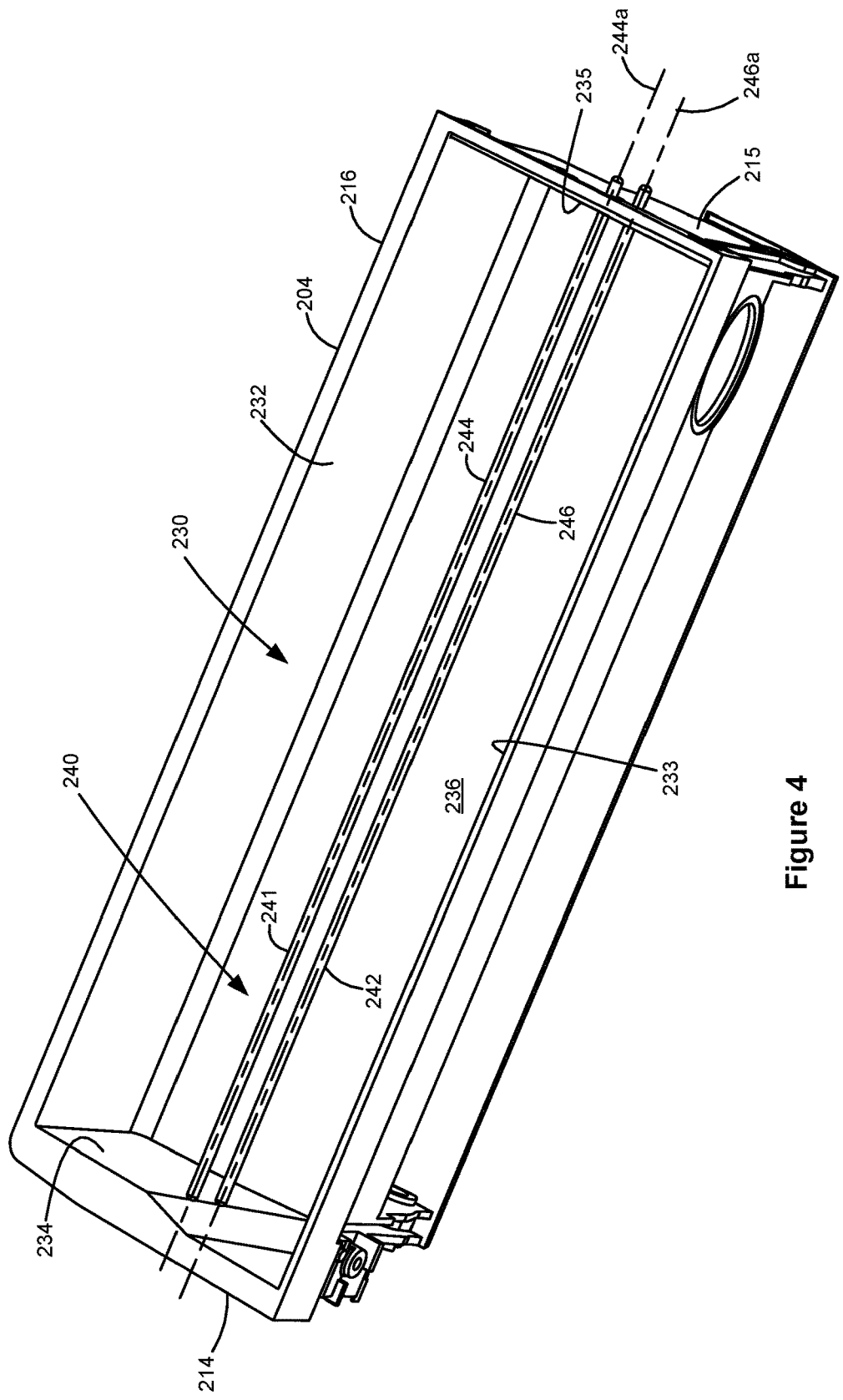
FIG. 4 is a perspective view of a portion of a photoconductor unit of the imaging unit shown in FIGS. 2 and 3 with a top wall omitted showing a waste toner reservoir having a capacitive toner level sensor according to one example embodiment.

FIG. 4 shows a waste toner reservoir 230 of PC unit 204 according to one example embodiment. In the example embodiment illustrated, waste toner reservoir 230 is formed by a front wall 232 that is positioned at front 216 of imaging unit 200, a rear wall 233 that is positioned opposite front wall 232, first and second side walls 234, 235 that are positioned at sides 214, 215 of imaging unit 200, respectively, a bottom 236 that is positioned at bottom 213 of imaging unit 200 and a top, which is omitted from FIG. 4 in order to show the interior of waste toner reservoir 230. In the example embodiment illustrated, waste toner reservoir 230 is generally the shape of a rectangular prism. However, waste toner reservoir 230 may take many different shapes and configurations as desired, including the use of one or more baffles, chambers, etc. within waste toner reservoir 230. In the example embodiment illustrated, waste toner enters reservoir 230 along rear wall 233, near bottom 236. However, toner may enter waste toner reservoir 230 according to any suitable entry point, including from multiple entry points.

Waste toner reservoir 230 includes a capacitive toner level sensor 240 for detecting a toner level in waste toner reservoir 230. Toner level sensor 240 includes a capacitor formed by a first electrode 241 and a second electrode 242 that is spaced from first electrode 241. Each electrode 241, 242 is composed of an electrically conductive material, such as metal. One of electrode(s) 241 or 242 is used to sense a capacitance value indicative of the toner level in waste toner reservoir 230 and the other electrode 241 or 242 is driven by a voltage during a capacitive sensing operation. The capacitor may be characterized by an inherent capacitance that varies in response to the amount of toner existing between electrode 241 and electrode 242. As toner is added to waste toner reservoir 230, toner replaces air in the space surrounding and between electrodes 241, 242. The dielectric constant of toner is generally different from the dielectric constant of air. As a result, changes in the capacitance of the capacitor occur due to a change in the composite dielectric constant of the substance between the respective electrodes 241, 242 such that changes in the capacitance of the capacitor indicate changes in the toner level in waste toner reservoir 230. One of the electrodes 241, 242 may be electrically coupled to sensing circuitry (not shown) that receives electrical signals appearing on the electrode 241 or 242 and that determines the capacitance of the capacitor. The sensing circuitry may be located in processing circuitry 44 of imaging unit 200, controller 28, a combination thereof or elsewhere within imaging system 20.

Electrodes 241, 242 are formed by respective rods 244, 246 that extend substantially parallel to each other within waste toner reservoir 230. In the example embodiment illustrated, rod 246 is spaced radially from rod 244 relative to a longitudinal axis 244a of rod 244 such that a longitudinal axis 246a of rod 246 is parallel to longitudinal axis 244a of rod 244. In other embodiments, rod 244 and/or rod 246 may be positioned outside of waste toner reservoir 230, for example, on an outer surface of one of the walls forming waste toner reservoir 230. However, positioning rods 244, 246 within waste toner reservoir 230 may provide more accurate toner level sensing. In the example embodiment illustrated, rods 244, 246 extend along a longitudinal dimension of waste toner reservoir 230, from side wall 234 to side wall 235. However, rods 244, 246 may be positioned in other orientations depending on the geometry of waste toner reservoir 230. In the example embodiment illustrated, each rod 244, 246 has a circular cross section. However, rods 244, 246 may have any suitable cross-sectional shape as desired, such as, for example, square, octagonal, etc. Rods 244, 246 may be hollow or solid. In the example embodiment illustrated, rods 244, 246 protrude through side wall 235 where electrical connections can be made to rods 244, 246.

Toner level sensor 240 aids in preventing the overfilling of waste toner reservoir 230, which may cause toner to leak from imaging unit 200 into image forming device 22. The toner level early in the life of waste toner reservoir 230, e.g., when waste toner reservoir 230 is less than half full, may be less important because plenty of space remains for additional toner. Accordingly, electrodes 241, 242 may be positioned in a manner that prioritizes detection that waste toner reservoir 230 is approaching or reaching a full condition over accuracy at low toner levels.

Figure 5:
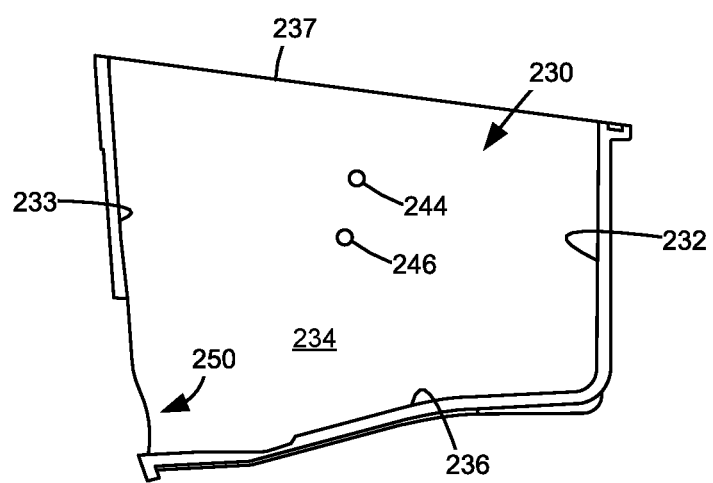
FIG. 5 is a schematic side view of the waste toner reservoir shown in FIG. 4 showing the positions of electrodes of the capacitive toner level sensor.

With reference to FIG. 5, in the example embodiment illustrated, rods 244, 246 are positioned in the center of waste toner reservoir 230 along the lateral dimension from front wall 232 to rear wall 233 and nearer the top 237 of waste toner reservoir 230 than bottom 236. In the embodiment illustrated, rod 244 is positioned higher than rod 246 such that as toner accumulates upward in waste toner reservoir 230, toner fills below rod 246, then accumulates around rod 246, fills the space between rods 244 and 246 and accumulates around rod 244. As discussed above, in the embodiment illustrated, a toner entry point 250 of toner into waste toner reservoir 230 is positioned along rear wall 233, near bottom 236 such that toner tends to accumulate from rear wall 233 toward front wall 232. Accordingly, in the embodiment illustrated, rod 244 is positioned slightly toward front wall 232 relative to rod 246.

Figure 6:
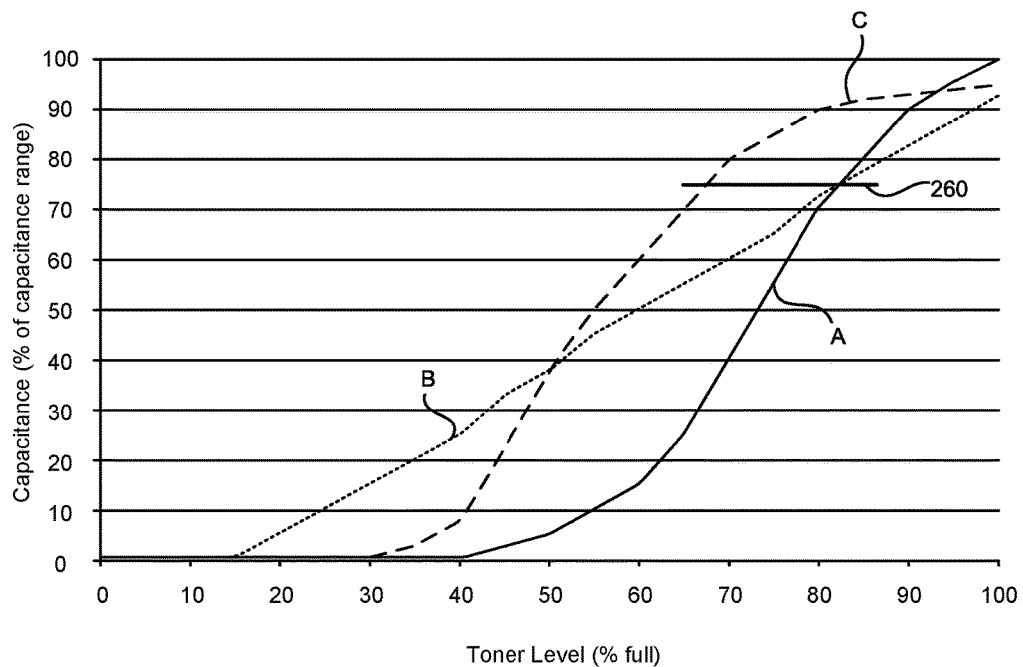
FIG. 6 is a line graph of the capacitance of the capacitive toner level sensor versus the toner level in waste toner reservoir (expressed as percentages of a full condition) according to one example embodiment.

FIG. 6 is an example graph of the capacitance of capacitive toner level sensor 240 having electrodes 241, 242 in the positions illustrated in FIG. 5 versus the toner level in waste toner reservoir 230. Capacitance in FIG. 6 is expressed as a percentage of the capacitance range of capacitive toner level sensor 240 from when waste toner reservoir 230 is empty to when waste toner reservoir 230 is full. The toner level in FIG. 6 is expressed as a percentage of the mass of toner present when waste toner reservoir 230 is full. Line A in FIG. 6 illustrates a capacitance curve generated when waste toner reservoir 230 is in its normal operating position within image forming device 22. Lines B and C in FIG. 6 illustrate capacitance curves generated when waste toner reservoir 230 is tipped or tilted as discussed in greater detail below.

As illustrated by line A in FIG. 6, the capacitance curve of capacitive toner level sensor 240 is generally S-shaped. When the toner level in waste toner reservoir 230 is low, e.g., less than half full, the toner in waste toner reservoir 230 is spaced far enough below rod 246 that the toner generates little change in the capacitance of toner level sensor 240 such that the capacitance remains relatively unchanged. As the toner level increases, e.g., past 50%, and toner approaches rod 246, the capacitance of toner level sensor 240 increases faster and continues to increase as the toner level continues to rise. Once the toner level in waste toner reservoir 230 reaches a nearly full condition and toner has accumulated around and between both rods 244, 246, the addition of toner has less impact on the capacitance of toner level sensor 240 since the areas immediately around rods 244, 246 are the most sensitive to toner. As a result, line A begins to flatten out approaching the 100% toner full level.

Because waste toner reservoir 230 is positioned in a replaceable unit in the example embodiment illustrated, the spatial orientation of waste toner reservoir 230 can be changed when imaging unit 200 is removed from image forming device 22 (or in the unlikely event that image forming device 22 is tilted or tipped with PC unit 204 installed therein). The tilting or tipping of waste toner reservoir 230 from its normal operating position may disturb the toner fill distribution in waste toner reservoir 230. Once imaging unit 200 is reinstalled in image forming device 22, the toner in waste toner reservoir 230 tends to gravitate back toward its normal fill distribution but may retain some of the disturbed toner fill distribution.

A significantly non-uniform toner fill distribution may alter the capacitance curve generated by toner level sensor 240. For example, line B in FIG. 6 illustrates a capacitance curve generated when waste toner reservoir 230 is tipped sideways such that the toner fill distribution in waste toner reservoir 230 is skewed more heavily toward one side wall 234 or 235 than the other side wall 234 or 235. As a result, the toner at one side of waste toner reservoir 230 approaches rod 246 more quickly than when waste toner reservoir 230 is in its normal operating position thereby causing the capacitance of toner level sensor 240 to begin to change sooner. This is illustrated by the rise of line B at a lower toner fill level than line A. However, as the toner fill progresses and less empty space is available for toner to fill, the toner begins to surround rods 244 and 246 such that the capacitance value of line B gradually approaches the capacitance value of line A. Line C in FIG. 6 illustrates a capacitance curve generated when waste toner reservoir 230 is tipped forward or rearward toward front wall 232 or rear wall 233 such that the toner fill distribution in waste toner reservoir 230 is skewed away from rear wall 233 and toward front wall 232 or vice versa. As a result, the toner initially approaches both rods 244 and 246 from the front or rear instead of initially approaching only rod 246 from below when waste toner reservoir 230 is in its normal operating position thereby causing the capacitance of toner level sensor 240 to begin to change sooner. This is illustrated by the rise of line C at a lower toner fill level than line A. The toner also surrounds both rods 244 and 246 more quickly than when waste toner reservoir 230 is in its normal operating position thereby causing the capacitance of toner level sensor 240 to approach its maximum value sooner. This is illustrated by the higher capacitance value in the 70-80% toner fill range of line C in comparison with line A. However, as the toner fill progresses and less empty space is available for toner to fill, the capacitance value of line C gradually approaches the capacitance value of line A.

The capacitance curves for a given waste toner reservoir 230 architecture and capacitive toner level sensor 240 configuration may be used to establish a threshold capacitance value for declaring that waste toner reservoir 230 is nearing a full state. For example, in the embodiment illustrated, a threshold capacitance value 260 may be established at the intersection of lines A and B between 70% and 80% of the capacitance range of toner level sensor 240, when waste toner reservoir 230 is roughly 75% full. Accordingly, once the threshold capacitance value 260 is reached, controller 28 (or another processor of imaging system 20) may proceed as if roughly 25% of the volume of waste toner reservoir 230 remains available. However, as discussed above, tilting of waste toner reservoir 230 may alter the actual amount of toner present in waste toner reservoir 230 when the threshold capacitance value 260 is reached. For example, line C in FIG. 6 shows that when waste toner reservoir 230 is tipped forward or rearward, waste toner reservoir 230 is only about 65% full, not ~75% full as predicted by lines A and B. Preferably, rods 244 and 246 are positioned such that if the toner distribution in waste toner reservoir 230 is disturbed due to tilting of waste toner reservoir 230, the threshold capacitance value 260 selected generates an early signal that waste toner reservoir 230 is nearing a full state rather than a delayed signal that waste toner reservoir 230 is nearing a full state in order to avoid overfilling of waste toner reservoir 230. For example, in the embodiment illustrated, line C in FIG. 6 reaches the threshold capacitance value 260 with more empty space remaining in waste toner reservoir 230 in comparison with the point at which lines A and B reach the threshold capacitance value 260. As a result, controller 28 may underestimate the available volume of waste toner reservoir 230 remaining. In contrast, if line B or C reached the threshold capacitance value 260 with more toner present in waste toner reservoir 230 than the point at which line A reaches the threshold capacitance value 260, overfilling of waste toner reservoir 230 could result if controller 28 overestimates the available volume of waste toner reservoir 230 remaining.

The capacitance data generated by toner level sensor 240 may be utilized in combination with algorithms performed by controller 28 (or another processor of imaging system 20) that use predictors of the amount of waste toner, such as, for example, the number of printed elements (or pels) printed using PC drum 224, the number of revolutions of PC drum 224, the number of pages printed using PC drum 224, etc. to estimate the toner level in waste toner reservoir 230. For example, the estimated toner level in waste toner reservoir 230 may be adjusted upon toner level sensor 240 reaching the threshold capacitance value 260. The near full warning provided by toner level sensor 240 is valuable in case environmental conditions, printing habits or other events result in more waste toner than predicted in order to prevent overfilling of waste toner reservoir 230. After reaching the threshold capacitance value 260, algorithms using, for example, one or more of the above mentioned variables may be used to ensure that waste toner reservoir 230 does not reach a full state.

The positions of rods 244, 246 in waste toner reservoir 230, including the positions of rods 244, 246 relative to each other, may be tailored to optimize the capacitance curves generated by toner level sensor 240 as desired. For example, if rods 244, 246 are moved upward, the steep portion of the capacitance curve of line A moves to the right as viewed in FIG. 6 since toner will not accumulate around and between rods 244, 246 until waste toner reservoir 230 is closer to a full state. Similarly, if rods 244, 246 are moved upward, the steep portion of the capacitance curve of line B moves to the right as viewed in FIG. 6. Further, if rods 244, 246 are moved forward or rearward such that rods 244, 246 are no longer centered along the lateral dimension from front wall 232 to rear wall 233, separate capacitance curves will be generated for tipping waste toner reservoir 230 forward toward front wall 232 and for tipping waste toner reservoir 230 rearward toward rear wall 233 instead of the single curve illustrated by line C in FIG. 6.

Generally, the use of rods, such as rods 244, 246, as electrodes 241, 242 of capacitive toner level sensor 240 does not appreciably reduce the capacity of waste toner reservoir 230 and does not impede the flow of toner into waste toner reservoir 230, particularly in comparison with the use of electrically conductive plates. Rods, such as rods 244, 246, are also generally less expensive than plates because less material is typically used and the rods may be conveniently formed from electrically conductive wire, which may be bent to form more complex geometries. However, because the surface area of the rods is small in comparison with the typical surface area of a pair of plates, the capacitance generated by a pair of parallel, electrically conductive rods is generally less than that of a pair of parallel, electrically conductive plates so that the signal to noise ratio is lower in comparison with a pair of parallel, electrically conductive plates.

Figure 7:
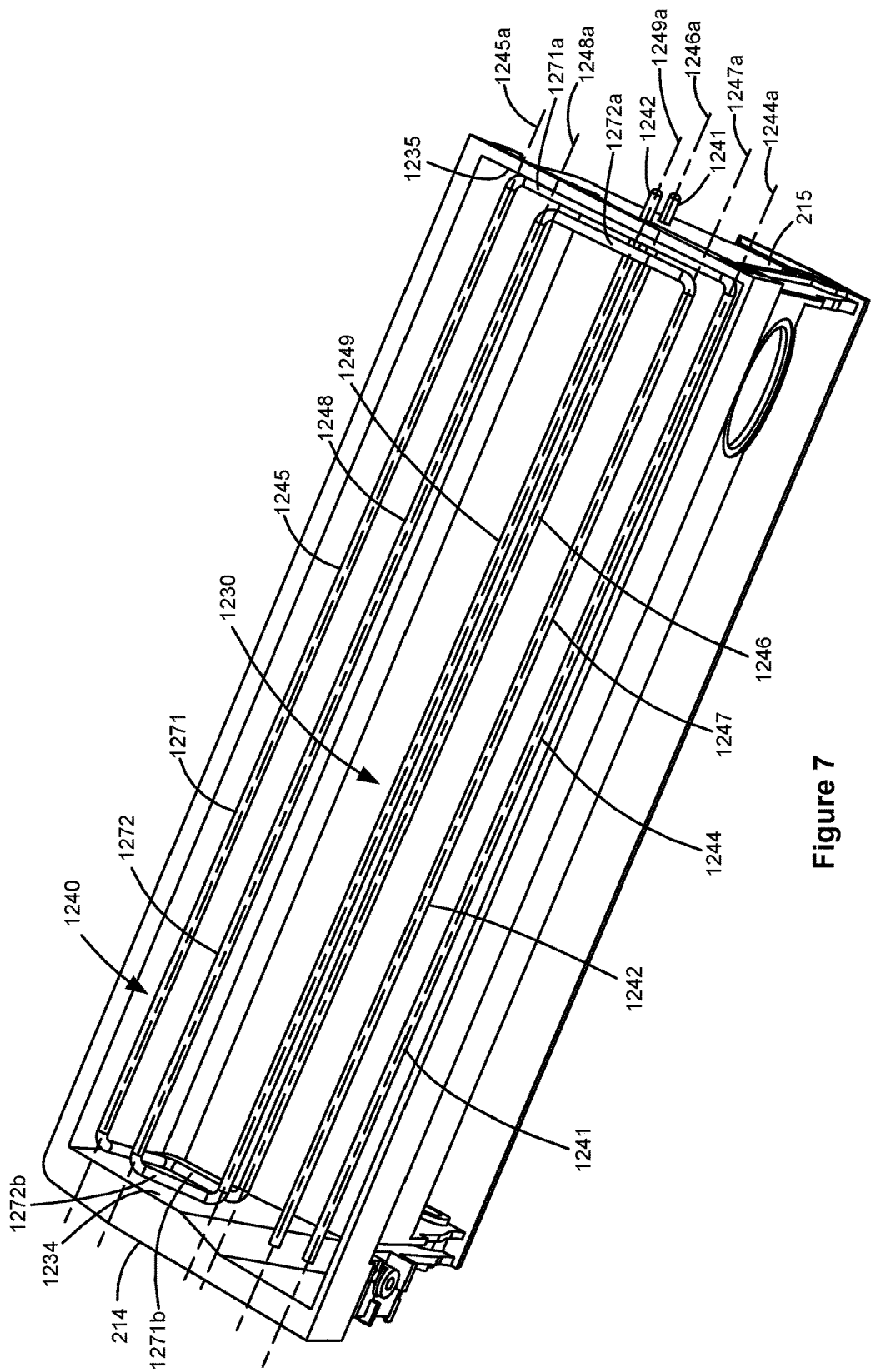
FIG. 7 is a perspective view of a portion of a photoconductor unit with a top wall omitted showing a waste toner reservoir having a capacitive toner level sensor according to a second example embodiment.
Figure 8A:
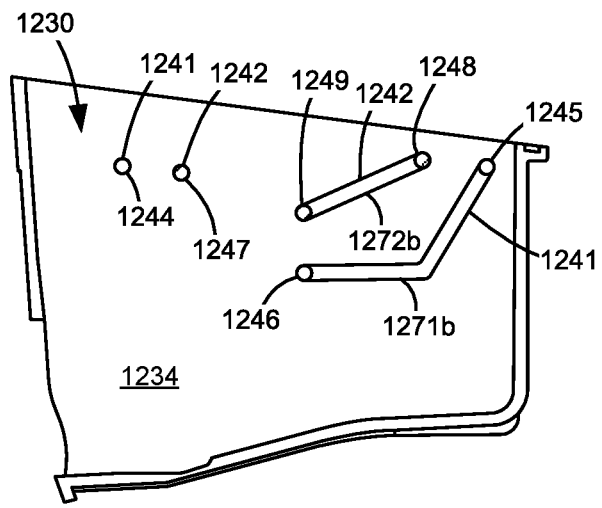
FIGS. 8A and 8B are schematic side views of the waste toner reservoir shown in FIG. 7 showing the positions of electrodes of the capacitive toner level sensor.
Figure 8B:
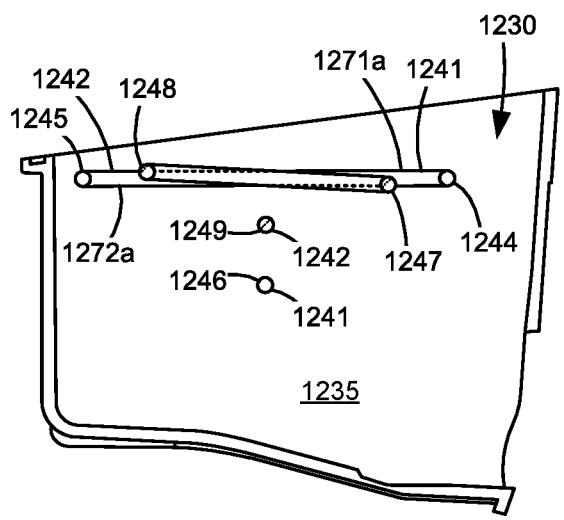

One approach to increasing the capacitance of toner level sensor 240 is to increase the number of parallel rod pairs. For example, FIG. 7 illustrates an example waste toner reservoir 1230 that includes a conductive toner level sensor 1240 having a pair of electrodes 1241, 1242, similar to electrodes 241, 242 discussed above. FIGS. 8A and 8B show the positions of electrodes 1241, 1242 at sides 214, 215 of imaging unit 200, respectively. With reference to FIGS. 7, 8A and 8B, electrode 1241 is formed by three spaced, electrically conductive rods 1244, 1245, 1246. Electrode 1242 is also formed by three spaced, electrically conductive rods 1247, 1248, 1249. Rods 1244, 1245, 1246, 1247, 1248, 1249 include parallel pairs formed by rods 1244 and 1247, rods 1245 and 1248 and rods 1246 and 1249. In the example embodiment illustrated, rod 1244 is positioned closer to rod 1247 than any other rod, rod 1245 is positioned closer to rod 1248 than any other rod and so on. In the embodiment illustrated, rod 1247 is spaced radially from rod 1244 relative to a longitudinal axis 1244a of rod 1244, rod 1248 is spaced radially from rod 1245 relative to a longitudinal axis 1245a of rod 1245 and rod 1249 is spaced radially from rod 1246 relative to a longitudinal axis 1246a of rod 1246. In this manner, a longitudinal axis 1247a of rod 1247 is parallel to longitudinal axis 1244a of rod 1244, a longitudinal axis 1248a of rod 1248 is parallel to longitudinal axis 1245a of rod 1245 and a longitudinal axis 1249a of rod 1249 is parallel to longitudinal axis 1246a of rod 1246. In the embodiment illustrated, rods 1244, 1245, 1246 extend parallel to each other and rods 1247, 1248, 1249 extend parallel to each other. However, rods 1244, 1245, 1246 and rods 1247, 1248, 1249 may be positioned in other orientations relative to each other. In the example embodiment illustrated, rods 1244, 1245, 1246, 1247, 1248, 1249 extend along a longitudinal dimension of waste toner reservoir 1230, from a side wall 1234 to a side wall 1235, but may be positioned in other orientations relative to waste toner reservoir 1230 as discussed above.

In the example embodiment illustrated, rods 1244, 1245, 1246 of electrode 1241 are electrically connected to each other and rods 1247, 1248, 1249 of electrode 1242 are electrically connected to each other. For example, rods 1244, 1245, 1246 of electrode 1241 may be formed by a common, electrically conductive wire 1271 and rods 1247, 1248, 1249 of electrode 1242 may be formed by a common, electrically conductive wire 1272. In the embodiment illustrated, wire 1271 includes a connecting segment 1271a that extends along side wall 1235 and joins rod 1244 to rod 1245 and a connecting segment 1271b that extends along side wall 1234 and joins rod 1245 to rod 1246. Similarly, wire 1272 includes a connecting segment 1272a that extends along side wall 1235 and joins rod 1247 to rod 1248 and a connecting segment 1272b that extends along side wall 1234 and joins rod 1248 to rod 1249. In this manner, rods 1244, 1245, 1246 are formed continuously with each other and rods 1247, 1248, 1249 are formed continuously with each other. In the embodiment illustrated, the distance between connecting segments 1271a and 1272a is no less than the distance between rods 1244 and 1247 and the distance between rods 1245 and 1248 and the distance between connecting segments 1271b and 1272b is no less than the distance between rods 1245 and 1248 and the distance between rods 1246 and 1249. Otherwise, if, for example, the distance between connecting segments 1271a and 1272a was less than the distance between rods 1244 and 1247, the capacitance measured could be skewed by the composite dielectric constant of the substance present between connecting segments 1271a and 1272a at side wall 1235, where electrodes 1241 and 1242 are closest to each other, rather than by the composite dielectric constant of the substance present between the various rod pairs along the length of waste toner reservoir 1230 as desired. In other embodiments, rods 1244, 1245, 1246 are separate components from each other and/or rods 1247, 1248, 1249 are separate components from each other. However, such a configuration increases the required number of electrical connections to rods 1244, 1245, 1246, 1247, 1248, 1249 from two to up to six.

The positions of rods 1244, 1245, 1246, 1247, 1248, 1249 may be selected to generate a desired capacitance curve as discussed above. For example, in the embodiment illustrated, rods 1244, 1245, 1246, 1247, 1248, 1249 are positioned in the upper half of waste toner reservoir 1230 in order to prioritize detection that waste toner reservoir 1230 is approaching or reaching a full condition.

Figure 9:
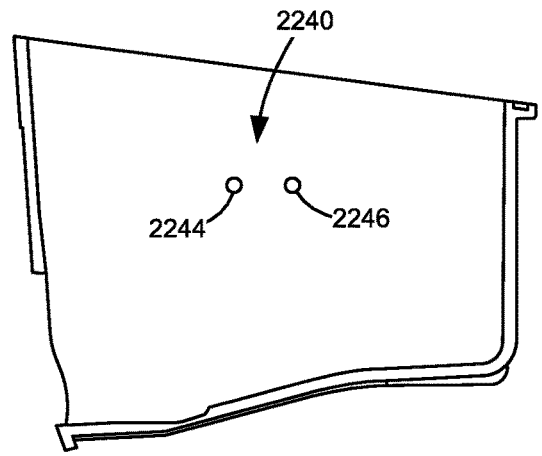
FIG. 9 is a schematic side view of a waste toner reservoir having a capacitive toner level sensor according to a third example embodiment.
Figure 10:
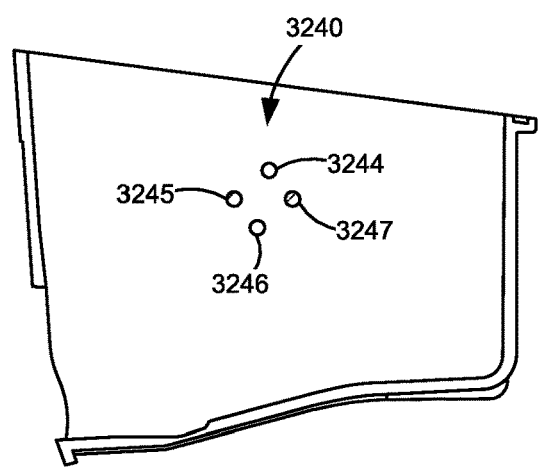
FIG. 10 is a schematic side view of a waste toner reservoir having a capacitive toner level sensor according to a fourth example embodiment.
Figure 11:
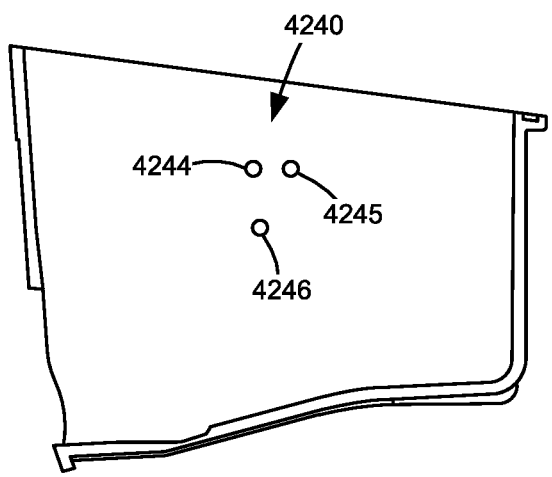
FIG. 11 is a schematic side view of a waste toner reservoir having a capacitive toner level sensor according to a fifth example embodiment.

While the example embodiment illustrated in FIGS. 4 and 5 includes two parallel rods and the example embodiment illustrated in FIGS. 7, 8A and 8B includes six parallel rods, it will be appreciated that many other configurations of parallel, electrically conductive rods may be used as desired. For example, FIG. 9 illustrates an example capacitive toner level sensor 2240 that includes a pair of rods 2244, 2246 that are horizontally aligned with each other. FIG. 10 illustrates an example capacitive toner level sensor 3240 that includes four rods 3244, 3245, 3246, 3247. FIG. 11 illustrates an example capacitive toner level sensor 4240 that includes three rods 4244, 4245, 4246. In this embodiment, rods 4244, 4245, 4246 form two parallel capacitors with one of the rods, e.g., rod 4246, serving as a common electrode of the two capacitors.

Further, while the example embodiments discussed above include a capacitive toner level sensor that includes electrodes formed by one or more parallel rod pairs, it will be appreciated that the rods forming a rod pair may be arranged in other orientations relative to each as desired other understanding that areas of a rod pair that are closer to each other will have a greater effect on the capacitance than areas of the rod pair that are farther from each other.

Although the example embodiments illustrated include a capacitive toner level sensor positioned in a waste toner reservoir, it will be appreciated that a capacitive toner level sensor may be positioned in any toner reservoir, such as, for example, a toner supply reservoir of toner cartridge 100 or the toner reservoir of developer unit 202. Further, although the example embodiment illustrated includes a waste toner reservoir 230 mounted on imaging unit 200, the waste toner reservoir may be positioned elsewhere within image forming device 22, such as, for example, as a separate replaceable unit of image forming device 22.

Although the example embodiment shown in FIG. 2 includes a pair of replaceable units in the form of toner cartridge 100 and imaging unit 200, it will be appreciated that the replaceable unit(s) of image forming device 22 may employ any suitable configuration as desired. For example, in one embodiment, the main toner supply for image forming device 22, developer unit 202 and PC unit 204 including waste toner reservoir 230 are housed in one replaceable unit. In another embodiment, the main toner supply for image forming device 22 and developer unit 202 are provided in a first replaceable unit and PC unit 204 including waste toner reservoir 230 is provided in a second replaceable unit. Further, although the example image forming device 22 discussed above includes one toner cartridge 100 and corresponding imaging unit 200, in the case of an image forming device configured to print in color, separate replaceable units may be used for each toner color needed. For example, in one embodiment, the image forming device includes four toner cartridges and four corresponding imaging units, each toner cartridge containing a particular toner color (e.g., black, cyan, yellow and magenta) and each imaging unit corresponding with one of the toner cartridges to permit color printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner container, comprising:
a housing having a reservoir for holding toner; and
a first electrode and a second electrode positioned on the housing, the first electrode and the second electrode form a capacitor having a capacitance that changes in response to a change in an amount of toner in the reservoir between the first electrode and the second electrode, the first electrode includes a first rod and a second rod electrically connected to the first rod, the second electrode includes a third rod and a fourth rod electrically connected to the third rod, the third rod is parallel to the first rod and is spaced radially from the first rod relative to a longitudinal axis of the first rod, the fourth rod is parallel to the second rod and is spaced radially from the second rod relative to a longitudinal axis of the second rod,
wherein the first, second, third and fourth rods are each positioned within the reservoir,
wherein the first electrode includes a first connecting segment positioned within the reservoir electrically connecting the first rod and the second rod.

2. The toner container of claim 1, wherein the second electrode includes a second connecting segment positioned within the reservoir electrically connecting the third rod and the fourth rod.

3. The toner container of claim 2, wherein a distance between the first connecting segment and the second connecting segment is no less than a distance between the first rod and the third rod and no less than a distance between the second rod and the fourth rod.

4. The toner container of claim 1, wherein the first rod is parallel to the second rod.

5. The toner container of claim 1, wherein the first rod is formed continuously with the second rod.

6. The toner container of claim 5, wherein the third rod is formed continuously with the fourth rod.

7. The toner container of claim 1, wherein the first and second rods are formed from a first common, electrically conductive wire.

8. A toner container, comprising:
a housing having a reservoir for holding toner; and
a first electrode and a second electrode positioned on the housing, the first electrode and the second electrode form a capacitor having a capacitance that changes in response to a change in an amount of toner in the reservoir between the first electrode and the second electrode, the first electrode includes a first rod and a second rod electrically connected to the first rod, the second electrode includes a third rod and a fourth rod electrically connected to the third rod, the third rod is parallel to the first rod and is spaced radially from the first rod relative to a longitudinal axis of the first rod, the fourth rod is parallel to the second rod and is spaced radially from the second rod relative to a longitudinal axis of the second rod,
wherein the third rod is positioned closer to the first rod than the third rod is to the second rod, and the fourth rod is positioned closer to the second rod than the fourth rod is to the first rod.

9. The toner container of claim 8, wherein the first, second, third and fourth rods are each positioned within the reservoir.

10. The toner container of claim 9, wherein the first electrode includes a first connecting segment positioned within the reservoir electrically connecting the first rod and the second rod.

11. The toner container of claim 10, wherein the second electrode includes a second connecting segment positioned within the reservoir electrically connecting the third rod and the fourth rod.

12. The toner container of claim 11, wherein a distance between the first connecting segment and the second connecting segment is no less than a distance between the first rod and the third rod and no less than a distance between the second rod and the fourth rod.

13. The toner container of claim 8, wherein the first rod is parallel to the second rod.

14. The toner container of claim 8, wherein the first rod is formed continuously with the second rod.

15. The toner container of claim 14, wherein the third rod is formed continuously with the fourth rod.

16. The toner container of claim 8, wherein the first and second rods are formed from a first common, electrically conductive wire.

* * * * *